US012255417B2

(12) United States Patent
Rohr

(10) Patent No.: US 12,255,417 B2
(45) Date of Patent: Mar. 18, 2025

(54) WIRELINE HEAD FOR CABLE TERMINATION

(71) Applicant: Schlumberger Technology Corporation, Sugar Land, TX (US)

(72) Inventor: William Rohr, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 375 days.

(21) Appl. No.: 17/659,536

(22) Filed: Apr. 18, 2022

(65) Prior Publication Data

US 2023/0335938 A1 Oct. 19, 2023

(51) Int. Cl.
*H01R 13/512* (2006.01)
*E21B 17/02* (2006.01)
(Continued)

(52) U.S. Cl.
CPC ......... *H01R 13/512* (2013.01); *E21B 17/023* (2013.01); *E21B 17/026* (2013.01); *H01R 13/502* (2013.01); *H01R 13/514* (2013.01); *H01R 13/5205* (2013.01); *H01R 13/521* (2013.01); *H01R 13/582* (2013.01);
(Continued)

(58) Field of Classification Search
CPC .. H01R 13/512; H01R 13/502; H01R 13/514; H01R 13/5205; H01R 13/521; H01R 13/582; H01R 43/18; H01R 13/516; H01R 13/518; H01R 13/52; H01R 13/5221;
(Continued)

(56) References Cited

U.S. PATENT DOCUMENTS

| | | | |
|---|---|---|---|
| 2010/0243320 | A1 | 9/2010 | Bryant et al. |
| 2017/0149231 | A1 | 5/2017 | Zivi et al. |
| 2019/0109450 | A1 | 4/2019 | Mangum et al. |

FOREIGN PATENT DOCUMENTS

| | | | |
|---|---|---|---|
| CN | 203081426 U | | 7/2013 |
| JP | 2002244001 A | * | 8/2002 |
| WO | 2023205178 A1 | | 10/2023 |

OTHER PUBLICATIONS

International Search Report and Written Opinion issued in International Patent Application No. PCT/US2023/018888 dated Jul. 26, 2023, 12 pages.

(Continued)

*Primary Examiner* — Justin M Kratt
(74) *Attorney, Agent, or Firm* — Jeffrey D. Frantz

(57) ABSTRACT

Examples herein include systems and methods for improved wireline heads for cable termination. An example wireline head can include a housing configured to receive a frustoconical-shaped object and having external threads on an outer surface of the housing. The wireline head can include a frustoconical liner shaped to fit within the housing. One or more inserts can fit within the liner, the inserts trapping an outer portion of the cable between each other or between an insert and the liner. An end cap can be threaded onto the external threads of the housing, applying force to the inserts and liner within the housing. With sufficient force, the liner can plastically deform and provide a secure connection for the cable. Conductors can be inserted between components to provide grounding. The wireline head can then manipulate a tool within a wellbore and send it power and data.

14 Claims, 3 Drawing Sheets

200

(51) Int. Cl.
*H01R 13/502* (2006.01)
*H01R 13/514* (2006.01)
*H01R 13/52* (2006.01)
*H01R 13/58* (2006.01)
*H01R 43/18* (2006.01)
*E21B 17/00* (2006.01)
*H01R 13/516* (2006.01)
*H01R 13/518* (2006.01)
*H01R 13/53* (2006.01)

(52) U.S. Cl.
CPC .............. *H01R 43/18* (2013.01); *E21B 17/00* (2013.01); *E21B 17/02* (2013.01); *H01R 13/516* (2013.01); *H01R 13/518* (2013.01); *H01R 13/52* (2013.01); *H01R 13/5221* (2013.01); *H01R 13/53* (2013.01)

(58) Field of Classification Search
CPC ..... H01R 13/53; E21B 17/023; E21B 17/026; E21B 17/00; E21B 17/02
See application file for complete search history.

(56) References Cited

OTHER PUBLICATIONS

International Preliminary Report on Patentability issued in International Patent application PCT/US2023/018888, dated Oct. 31, 2024, 7 pages.

* cited by examiner

WIRELINE HEAD FOR CABLE TERMINATION

BACKGROUND

In the oil and gas industry, wireline cables are used to lower downhole tools into a wellbore to perform various services. A wireline cable (also referred to herein as a "wireline" or "cable" herein) can include electrical cabling capable of conveying power and data, to control tools and acquire real-time data from their operation. A wireline cable can also include strengthening elements such as armored cabling that not only protects the wireline but also provides tensile strength for supporting a tool as it is raised or lowered within a wellbore.

A wireline cable is typically terminated both electrically and mechanically via a cable termination. A wireline head is then typically used to contain the cable termination and connect the cable to a downhole tool. A wireline head with cable termination refers to a mechanical and electrical coupling that securely terminates or secures the cable and allows for connection to a tool. Cable termination can include any type of mechanical cable connection and does not imply that the entire cable ends at the termination location—rather, at least some of the cable, such as the portion that carries power and data, can continue past the termination location such that it can interface with a tool as necessary.

The portion of the wireline head that terminates and secures the cable is typically referred to as a rope socket, and the terms "wireline head," "cable termination," and "rope socket" are used interchangeably herein to refer to the portion of the wireline head forming the rope socket. As wireline heads have evolved for more complex use cases, such as sealed wireline heads, their associated rope sockets have become more complex and costly. Additionally, portions of the rope socket and the cable must be discarded each time a cable is re-terminated, such as for use with a different type of tool. These factors lead to additional cost, time, and labor when using wireline cables in the field.

Previous rope socket solutions utilize complex combinations of cones (or more accurately, frustums of cones) and springs to securely terminate a wireline. For example, such a rope socket can include multiple components that hold or trap portions of the wireline. These components are typically mechanically forced together, such as by hammering the cones into place to seat them on the cable armors. A rope socket can utilize one or more O-ring-type seals to maintain a tight seal and at least one canted spring to maintain a secure electrical connection. These types of rope sockets are not reusable and therefore are typically discarded after a single use.

As a result, a need exists for a more elegant rope socket design that allows for secure cable termination with reusable components while reducing the complexity, cost, and time associated with terminating wireline cables.

SUMMARY

Examples described herein include systems and methods associated with improved wireline heads for cable termination. In one example, an apparatus is provided for terminating a cable. The apparatus, referred to as a rope socket below for ease of discussion, can include various components. For example, it can include a housing having an interior surface and exterior surface. The interior surface of the housing can be frustoconical shaped, such that it can receive a frustoconical-shaped object or objects within it. The exterior surface of the housing can have threads configured to receive an internally threaded object such as a cap. Various components of the disclosed systems and methods are described herein as "cones," "cone-shaped," "conical," and so on. These descriptions are explicitly intended to capture frustums of cones, which are cones that have the tip truncated by a plane parallel to the base of the cone. The terms "cones," "cone-shaped," and "conical" are not intended to draw a distinction between cones and frustums, and instead are used for ease of understanding while explicitly encompassing both cones and frustums.

The rope socket can also include a conical liner shaped to fit within at least a portion of the housing such that an exterior surface of the conical liner contacts the interior surface of the housing. The conical liner can be constructed from a material having a lower yield point than a material used to construct the housing, allowing for the application of force that causes the liner to deform but does not cause the housing to deform, as discussed in more detail below.

The rope socket can further include at least one cone shaped to fit within the conical liner and trap a portion of the cable between the at least one cone and the conical liner. In an example, the at least one cone includes an intermediate cone and an inner cone. These cones can be constructed of a material similar to that of the housing, such that a force sufficient to deform the liner would not necessarily deform the intermediate or inner cone. The intermediate cone can be shaped to trap an outer portion of the cable between the intermediate cone and the conical liner, while the inner cone can be shaped to trap an intermediate portion of the cable between the inner cone and the intermediate cone.

As described herein, the cable can include one or more conductive materials, liners, sheaths, armor, serving, electrical conductors, or any combination thereof. For example, armored cables can have one or more outer layers constructed from a resilient material such as metal or carbon fiber. When terminating the cable using the rope socket, an operator can spread the outer portion of the cable from the inner portion of the cable and place it between the intermediate cone and conical liner. Similarly, a different portion of the cable can be placed between the intermediate cone and the inner cone. The cones trapping conductive materials provide a direct contact to housing, eliminating the need for a secondary means to provide a direct and secure contact.

To secure the rope socket, a mechanical fastener or locking system can be used to apply appropriate force to the components within the rope socket. For example, a threaded end cap can be used, having internal threads that engage with external threads on the housing. Tightening the end cap can apply a force to one or more of the inner cone, intermediate cone, and liner, eventually causing the liner to plastically deform (i.e., non-reversibly deform). This deformation provides a tight connection amongst the various components, securely terminating the cable in the rope socket.

The wireline head can be configured to couple to a tool, such that the wireline head supports the weight of the tool and allows the tool to be raised or lowered within a wellbore. The rope socket provides a secure connection between the wireline head and the cable, allowing an operator to wind or unwind the cable at the surface to raise or lower the tool within the wellbore.

Examples described herein further include methods for terminating a cable, such as by using the example apparatus above. A first example method can include providing a housing that has an interior surface and an exterior surface, where the interior surface is conically shaped. The method can also include inserting a conical liner into the housing. The liner can be shaped to fit within at least a portion of the housing such that an exterior surface of the liner contacts the interior surface of the housing. The method can further include inserting at least one cone into the conical liner, the at least one cone shaped to fit within the conical liner and trap a portion of the cable between the at least one cone and the conical liner. The method can also include securing an end cap to the housing, where the end cap applies a force to the at least one cone sufficient to cause the conical liner to plastically deform without causing deformation of the housing.

A second example method can include providing a wireline head that includes (1) a housing that has an interior surface and an exterior surface, where the interior surface is conically shaped, (2) a conical liner shaped to fit within at least a portion of the housing such that an exterior surface of the liner contacts the interior surface of the housing, (3) at least one cone shaped to fit within the conical liner and trap a portion of the cable between the at least one cone and the conical liner, and (4) an end cap that couples to the housing, the end cap configured to apply a force to the at least one cone sufficient to cause the conical liner to plastically deform without causing deformation of the housing. The example method can further include terminating the cable with the wireline head, such as by inserting the appropriate portions of the cable between the conical liner and the at least one cone, and securely fastening an end cap such that the conical liner plastically deforms.

Some or all portions of the example methods described herein can be performed using a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out some or all of the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Examples described herein include systems and methods associated with improved wireline heads for cable termination. An example wireline head can include a housing configured to receive a cone-shaped object within it and having external threads on an outer surface of the housing. The wireline head can include a conical liner shaped to fit within the housing. The conical inner surface of the housing can be smooth or textured, such as threaded, rippled, or corrugated, to help retain the liner. One or more cones can fit within the liner, the cones trapping an outer portion of the cable between each other or between a cone and the liner. An end cap can be threaded onto the external threads of the housing, applying force to the cones and liner within the housing. With sufficient force, the liner can plastically deform and provide a secure connection for the cable. The wireline head can then be used to raise or lower a tool within a wellbore.

Figure 1:
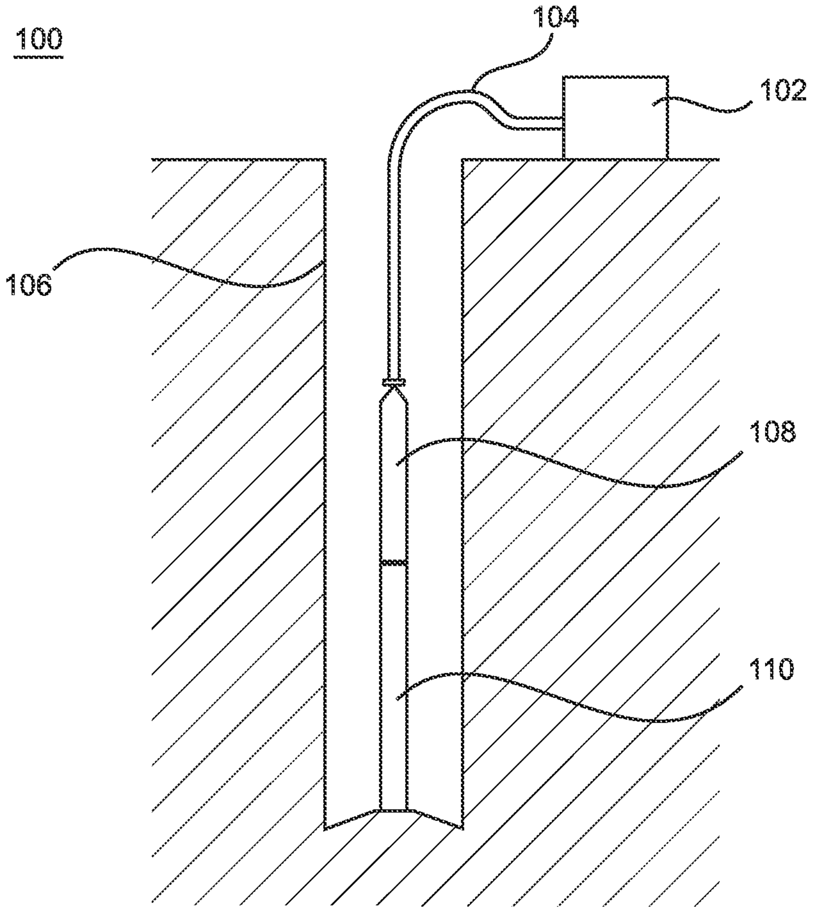
FIG. 1 is an illustration of a generic tool being placed within a wellbore using a wireline connected to the tool by an example wireline head.

FIG. 1 shows a diagram of an example in-field usage environment and associated system 100 for wireline operations, in accordance with embodiments of the disclosure. For example, the system 100 includes wireline surface equipment 102 and an associated wireline cable 104. The wireline surface equipment 102 can include any components necessary to operate a wireline cable 104. For example, the equipment 102 can include mechanical components for controlling the wireline 104, such as a spool or reel upon which the wireline cable 104 is wound, and a motor that rotates the spool or reel to wind and unwind the wireline cable 104. The wireline surface equipment 102 can also include various electrical components, such as a control system. The control system can, for example, control the winding and unwinding of a wireline spool or the operation of a tool 110, either automatically or based on operator input. The control system of the wireline surface equipment 102 can include one or more computing devices, such as a computer, smartphone, or tablet. The equipment 102 can also include a power source that provides power to the wireline 104. The equipment 102 can also send and receive data through the wireline cable 104.

In some examples, wireline cable 104 can include multi-conductor lines and single-conductor lines that can be used with equipment that is inside a wellbore 106. The wellbore 106 can include a hole that is drilled to aid in the exploration and recovery of natural resources, including oil, gas, or water. In some examples, multi-conductor lines can include external armor wires wound around a core of multiple conductors. The conductors can be bound together in a central core, protected by the outer armor wires. The conductors can be used to transmit power to the downhole instrumentation and transmit data to and from the surface equipment 102 (e.g., computers, mobile devices, and the like). In other aspects, the single-conductor cables can be similar in construction to multi-conductor cables but can only have one conductor. In other aspects, single-conductor cables can be used for well construction activities such as pipe recovery, perforating and plug setting as well as production logging and reservoir production characterization.

The wireline cable 104 can be used to physically raise or lower a tool 110 within the wellbore 106, for example by operating the wireline surface equipment 102 to reel the cable 104 in or out. The wireline cable 104 can also provide power and data lines to the tool 110. A wireline head 108 can be used to attach the wireline cable 104 to the tool 110. As explained in more detail with respect to the remaining drawings, the wireline head 108 can include a rope socket that terminates, or secures, the wireline cable 104 within the wireline head 108. The wireline head 108 can also detachably couple to the tool 110, providing a mechanical and electrical connection between the wireline cable 104 and the tool 110.

Figure 2:
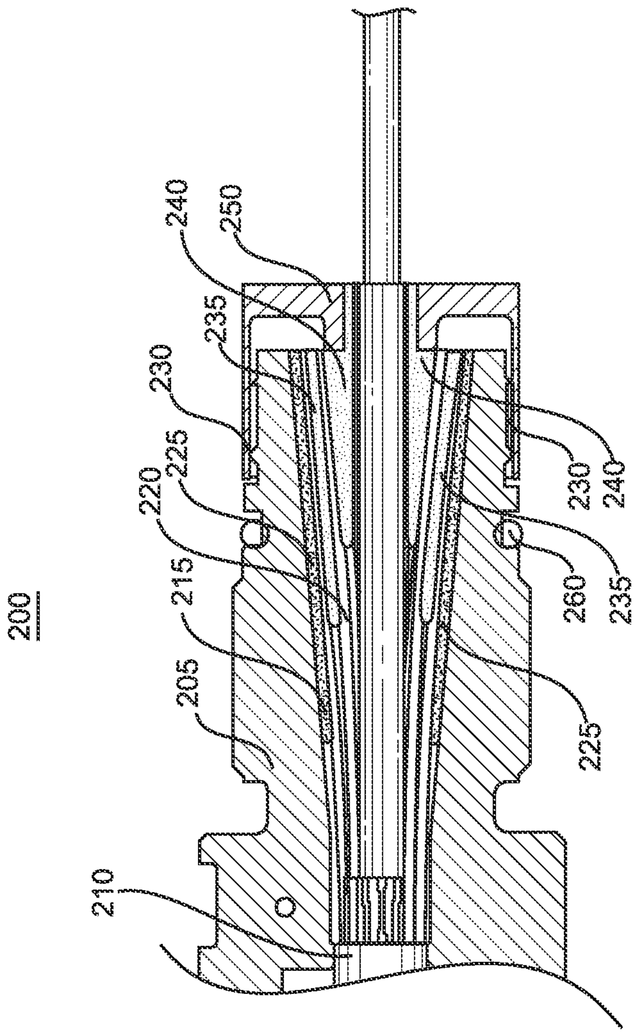
FIG. 2 is a cross-sectional illustration of an example wireline head as disclosed herein.

FIG. 2 provides a cross-sectional diagram of an example wireline head 200 used to securely attach a wireline cable 210. The diagram of FIG. 2 provides a partial view of the wireline head 200, omitting the portion not relevant to the disclosure. The omitted portion can be a sealed or unsealed wireline head. This example diagram is oriented such that the portion of the cable 210 extending in the left direction corresponds to the wireline cable 104 of FIG. 1 that connects to the wireline surface equipment 102, while the portion of the cable 210 extending to the right connects to a tool (not shown) such as the tool 110 in FIG. 1. The wireline cable 210 includes various portions or layers, such as a resilient outer layer 215. The outer layer 215 can be an armor cabling or sheath, for example, that is capable of withstanding tensile loads suited for supporting a tool 110. The outer layer 215 can also provide waterproofing for interior portions of the cable 210.

In the example of FIG. 2, the cable 210 also includes a second layer 220 underneath the outer layer 215. The second layer 220 can include similar armor characteristics of the outer layer 215, providing additional tensile strength for the cable 210. Sections of the outer layer 215 and second layer 220 can be separated from the remaining portions of the cable 210 by an operator and used to secure the cable 210 to the wireline head 200, as explained below.

The wireline head 200 can include a housing 205 as shown in FIG. 2. The housing 205 can be formed from a main body portion of the wireline head 200, such that an outer surface of the housing 205 is exposed to the exterior environment while an inner surface of the housing 205 is shaped to receive components for securing the cable 210. For example, an interior surface of the housing 205 can be formed with a conical shape. As explained above, any description of "cones," "conical," or "cone-shaped" is understood to include frustoconical shapes, and no distinction is intended between the two shapes.

One such component that can be received in the housing 205 is a liner 225. The liner can be formed in a conical shape such that an exterior surface of the liner 225 contacts an inner surface of the housing 205, as shown in FIG. 2. The liner can be placed in the housing 205 by an operator working to secure the cable 210 in the wireline head 200. In some examples, the liner 225 is the only non-reusable portion of the wireline head 200, as it can be configured to experience deformation in a manner explained below. The liner 225 can shield the housing 205 from compressive forces required to fully secure the cable 210, such that housing 205 can be reused for future cable connections.

An interior surface of the liner 225 can contact the outer layer 215 of the cable 210. For example, an operator can separate a portion of the outer layer 215 of the cable 210 and cause it to spread apart, with expansion provided by other components within the wireline head 200 as explained below. The outer layer 215 of the cable 210 can be sandwiched between the liner 225 and an intermediate insert 235, also referred to as an intermediate cone 235. The intermediate insert 235 can have a conical shape such that when inserted into the housing 205, the intermediate insert 235 compresses the outer layer 215 between itself and the liner 225, as shown.

Similarly, an inner insert 240 can be included to secure additional portions of the cable 210. In particular, the inner insert 240 can have a conical shape such that when inserted into the housing 205, the inner insert 240 compresses the second layer 220 of the cable 210 between the inner insert 240 and the intermediate insert 235, as depicted by FIG. 2. The inner insert 240 can be inserted by an operator and pressed into position. Conductors may be inserted between liners and/or cap to provide electrical connection to the cable armors and housing.

To secure these various components, an end cap 250 can be fastened to the housing 205 in a manner that applies a force to one or more of the inner insert 240, intermediate insert 235, and liner 225. In one example, the end cap 250 is internally threaded and configured to engage threads 230 on an external surface of the housing 205. As the end cap 250 is screwed onto the threads 230 of the housing 205, it applies a compressive force to one or more components within the housing 205. This compressive force, when applied in sufficient magnitude, can cause deformation of the liner 225. Although an end cap 250 is shown for applying the compressive force, the required force can alternatively be provided by pressing or hammering the inner insert 240 and/or intermediate insert 235 into place.

In more detail, the forces applied to the inner insert 240 or intermediate insert 235, or both, can apply compressive force to the second layer 220 and outer layer 215 of the cable 210. The outer layer 215 of the cable 210, in turn, applies pressure to the liner 225. In some examples, the liner 225 is constructed from a material having a lower yield point than the material used to construct the housing 205, outer layer 215, and inserts 235, 240. By way of example, the liner can be constructed from aluminum while the other components are made from steel. The liner 225 can be configured to plastically deform, meaning that the liner 225 deforms to an extent such that it will not return to its original form when the deforming force is removed. In some examples, the liner 225 includes a deformable layer, such that only a portion of the liner 225 deforms. As an example, the liner 225 can include a steel inner surface and an aluminum out surface, providing the housing 205 with a softer material to interface with such that the housing 205 does not experience damage from the compressive forces of the rope socket components.

In some examples, the end cap 250 can be configured to interface with a tool 110 such that installation of the end cap 250 also couples the tool 110 to the wireline head 200. In other examples, the tool 110 couples to the wireline head 200 by engaging one or more external surfaces of the wireline head 200. Other connection techniques can also be used to connect the wireline head 200 and tool 110. In this manner, the wireline head 200 can provide mechanical and electrical control of a tool 110 used within the well bore. Further, an o-ring 260 can be positioned to seal the inside of the wireline head 200 from wellbore fluid.

Figure 3:
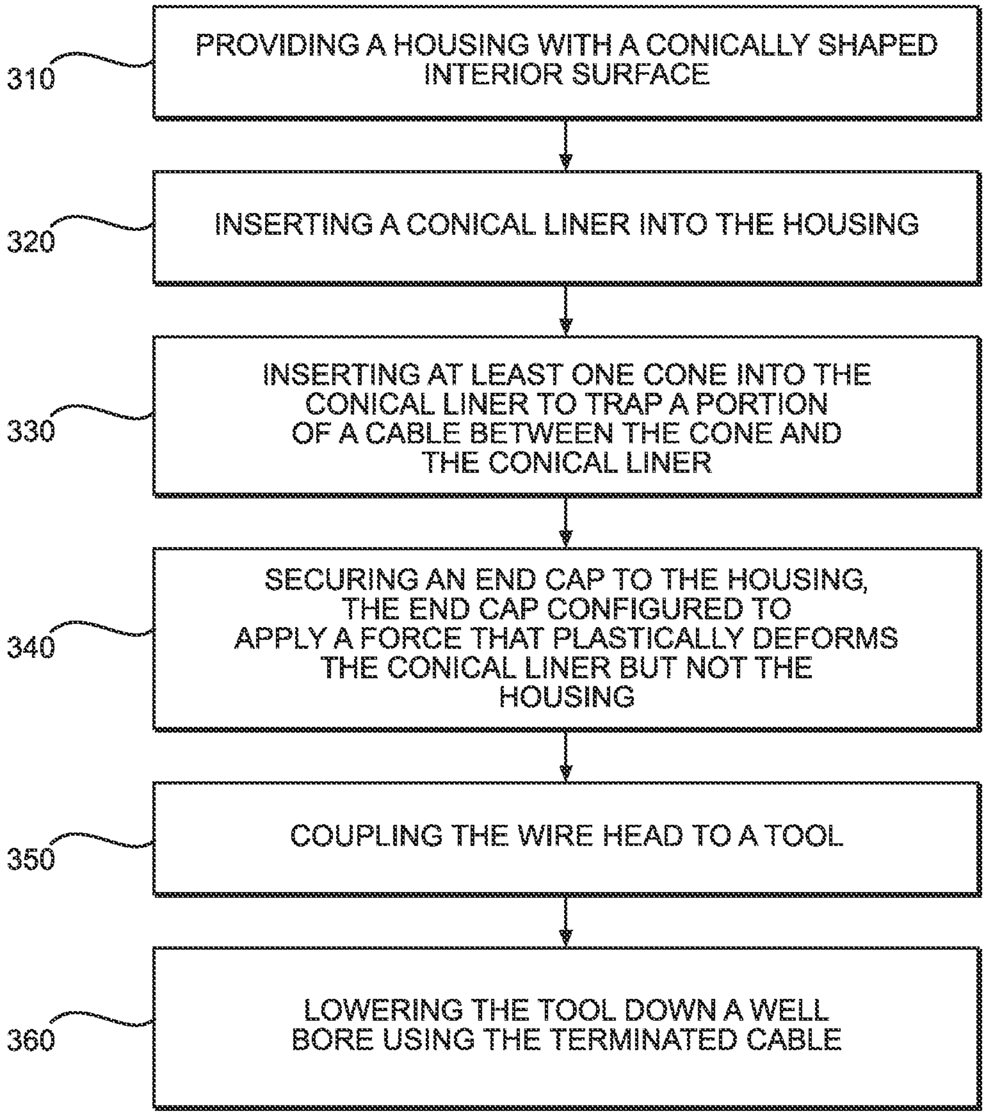
FIG. 3 is a flowchart of an example method for terminating a cable using a wireline head.

FIG. 3 provides a flowchart of an example method for securing a cable using the apparatus described above with respect to FIG. 2. Stage 310 of the example method can include providing a housing with a conically shaped interior surface. For example, the housing 205 can be formed from a main body portion of the wireline head 200, such that an outer surface of the housing 205 is exposed to the exterior environment while an inner surface of the housing 205 is shaped to receive components for securing a cable 210. An interior surface of the housing 205 can be formed with a conical shape, including a frustoconical shape as explained previously.

This stage of the method can include providing the wireline head 200, such as by an operator retrieving a wireline head 200 from use in the field or receiving a new wireline head 200 from a supplier. In some examples, this stage includes removing one or more parts of the wireline head 200, such as by removing a previously connected cable 210 or removing inserts within the housing 205.

Stage 320 can include inserting a conical liner, such as liner 225, into the housing 205. The liner can be formed in a conical shape such that an exterior surface of the liner 225 contacts an inner surface of the housing 205, as shown in FIG. 2. The liner can be placed in the housing 205 by an operator working to secure the cable 210 in the wireline head 200. In some examples, the liner 225 is the only non-reusable portion of the wireline head 200, as it can be configured to experience plastic deformation. The liner 225 can shield the housing 205 from compressive forces required to fully secure the cable 210, such that housing 205 can be reused for future cable connections. This stage 320 can be performed by physically inserting the liner 225 by hand, or by using a mechanical means such as a press.

Stage 330 can include inserting at least one insert into the liner 225 to trap a portion of a cable between the cone and the liner 225. For example, an operator can separate a portion of an outer layer 215 of the cable 210 and cause it to spread apart, with expansion provided by the at least one insert. The outer layer 215 of the cable 210 can be sandwiched between the liner 225 and an insert, such as the intermediate insert 235 of FIG. 2. The insert 235 can have a conical shape such that when inserted into the housing 205, the insert 235 compresses the outer layer 215 of the cable between the insert 235 and the liner 225.

In some examples, this stage can include inserting a second insert, such as the inner insert 240 of FIG. 2. The inner insert 240 can be included to secure additional portions of the cable 210, for example. In particular, the inner insert 240 can have a conical shape such that when inserted into the housing 205, the inner insert 240 compresses a second layer 220 of the cable 210 between the inner insert 240 and the intermediate insert 235, as depicted by FIG. 2. The inserts 235, 240 can be inserted by an operator and pressed into position, either by hand or by using mechanical advantage provided by a press or other device. Although two inserts 235, 240 are described, some embodiments can require only one insert that traps a portion of the cable 210 between the insert and the liner 225.

Stage 340 can include securing an end cap to the housing, where the end cap is configured to apply a force that plastically deforms the liner 225 but not the housing 205. In one example, the end cap 250 is internally threaded and configured to engage threads 230 on an external surface of the housing 205. As the end cap 250 is screwed onto the threads 230 of the housing 205, it applies a compressive force to one or more components within the housing 205. This compressive force, when applied in sufficient magnitude, can cause plastic deformation of the liner 225. This stage can include securing the end cap 250 using any mechanism for tightening. For example, the end cap 250 can be turned by hand in one example.

In another example, a portion of the end cap 250 is shaped like a bolt head, such that it can accept a socket. The socket can be connected to a wrench such that the operator can turn the end cap 250 by rotating the wrench. In another example, the operator can use a power tool, such as an impact gun with a socket connected to it, to turn the end cap 250 into place. This stage includes the operator securing the end cap 250 to a particular torque range. For example, the operator can use a torque wrench to ensure that the end cap 250 is tightened to within a range of 90-110 foot-pounds. Although an end cap 250 is shown for applying the compressive force, the required force can alternatively be provided by pressing or hammering the inner insert 240 and/or intermediate insert 235 into place.

Stage 350 can include coupling the wireline head 200 to a tool. In some examples, this stage includes inserting the wireline head 200 into a receiving location of the tool 110, where the receiving location is configured to interlock with a portion of the wireline head 200. For example, the wireline head 200 can be inserted and rotated into a locked position. In addition, the wireline head 200 can include a locking mechanism, such as a pin, that is applied to lock the wireline head 200 into the tool 110.

This stage can also include splicing a portion of the cable 210 into the tool 110. For example, the assembled wireline head 200 can allow an inner portion of the cable 210, such as a portion that carries power and data, to exit the wireline head 200 such that it can be connected to an electrical connector associated with the tool 110. The operator can make this connection before securing the wireline head 200 to the tool 110 body in some examples. In some examples, as explained with respect to FIG. 2, the end cap 250 can be formed as a portion of the tool 110, such that the end cap 250 is installed by rotating the wireline head 200 with respect to the combined tool 110 and end cap 250 assembly.

Stage 360 can include lowering the tool 110 down a well bore using the attached cable 210. This can include inserting the tool 110 into the well bore and controlling the cable 210 using wireline surface equipment 102. The wireline surface equipment 102 can also include various electrical components, such as a control system. The control system can, for example, control the winding and unwinding of a wireline spool or the operation of a tool 110, either automatically or based on operator input. The control system of the wireline surface equipment 102 can include one or more computing devices, such as a computer, smartphone, or tablet. The equipment 102 can also include a power source that provides power to the wireline 104. The equipment 102 can also send and receive data through the wireline cable 104.

An operator can control the wireline surface equipment 102 to lower the tool 110 down to the appropriate operating location. The operator can use feedback from the tool 110, provided from sensors associated with the tool 110 that send data to the wireline surface equipment 102, to determine the location and operational status of the tool 110. For example, the feedback from the sensors can allow an operator to know how deep the tool 110 is, the flow rate of fluid proximate the tool 110, the RPM of moving portions of the tool 110, power draw by the tool 110, and other operational data. This stage can also include the operator adjusting the position of the tool 110 via the cable 210, including raising the tool 110 to the surface for maintenance or removal.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. An apparatus for securing a cable, the apparatus comprising:

a housing comprising an interior surface and an exterior surface, wherein the interior surface is frustoconically shaped;

a frustoconical liner shaped to fit within at least a portion of the housing such that an exterior surface of the frustoconical liner contacts the interior surface of the housing;

an intermediate insert shaped to fit within the frustoconical liner and trap an outer portion of the cable between the intermediate insert and the frustoconical liner;

an inner insert positioned at least partially within the intermediate insert, the inner insert shaped to trap a second portion of the cable between the inner insert and the intermediate insert; and an end cap that couples to the housing, the end cap configured to apply a force to the intermediate insert sufficient to cause the frustoconical liner to plastically deform without causing deformation of the housing.

2. The apparatus of claim 1, wherein the end cap couples to the housing using a threaded connection.

3. The apparatus of claim 2, wherein the exterior surface of the housing comprises threads for receiving the end cap.

4. The apparatus of claim 1, wherein the end cap applies force to both the intermediate insert and the inner insert.

5. The apparatus of claim 1, wherein the liner is constructed from material having a lower yield point than material used to construct the housing.

6. The apparatus of claim 1, wherein the housing is configured to attach to a tool such that the tool can be lowered down a wellbore using the cable.

7. A method for securing a cable, the method comprising:

providing a housing comprising an interior surface and an exterior surface, wherein the interior surface is frustoconically shaped;

inserting a frustoconical liner into the housing, the frustoconical liner shaped to fit within at least a portion of the housing such that an exterior surface of the frustoconical liner contacts the interior surface of the housing;

inserting an intermediate insert into the frustoconical liner, the intermediate insert shaped to fit within the frustoconical liner and trap an outer portion of the cable between the intermediate insert and the frustoconical liner;

inserting an inner insert at least partially into the intermediate insert, the inner insert shaped to trap a second portion of the cable between the inner insert and the intermediate insert; and securing an end cap to the housing, the end cap configured to apply a force to the intermediate insert sufficient to cause the frustoconical liner to plastically deform without causing deformation of the housing.

8. The method of claim 7, wherein the end cap couples to the housing using a threaded connection.

9. The method of claim 8, wherein the exterior surface of the housing comprises threads for receiving the end cap.

10. The method of claim 7, wherein the end cap applies force to both the intermediate insert and the inner insert.

11. The method of claim 7, wherein the liner is constructed from material having a lower yield point than material used to construct the housing.

12. The method of claim 7, wherein the housing is configured to attach to a tool such that the tool can be lowered down a wellbore using the cable.

13. A method for securing a cable, the method comprising:

providing a wireline head comprising:

a housing comprising an interior surface and an exterior surface, wherein the interior surface is frustoconically shaped;

a frustoconical liner shaped to fit within at least a portion of the housing such that an exterior surface of the frustoconical liner contacts the interior surface of the housing;

an intermediate insert shaped to fit within the frustoconical liner and trap an outer portion of the cable between the intermediate insert and the frustoconical liner;

an inner insert positioned at least partially within the intermediate insert, the inner insert shaped to trap a second portion of the cable between the inner insert and the intermediate insert; and an end cap that couples to the housing, the end cap configured to apply a force to the intermediate insert sufficient to cause the frustoconical liner to plastically deform without causing deformation of the housing; and securing the cable with the wireline head.

14. The method of claim 13, further comprising removing the cable from the wireline head by removing the end cap, the inner insert, the intermediate insert, and the frustoconical liner.

* * * * *